(12) United States Patent
Zeituni et al.

(10) Patent No.: US 12,401,925 B2
(45) Date of Patent: Aug. 26, 2025

(54) IMAGE SENSOR ARRAY WITH CAPACITIVE CURRENT SOURCE AND SOLID-STATE IMAGING DEVICE COMPRISING THE SAME

(71) Applicant: Sony Semiconductor Solutions Corporation, Atsugi (JP)

(72) Inventors: Golan Zeituni, Stuttgart (DE); Noam Zeev Eshel, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 135 days.

(21) Appl. No.: 18/282,227

(22) PCT Filed: Mar. 22, 2022

(86) PCT No.: PCT/EP2022/057484
§ 371 (c)(1),
(2) Date: Sep. 15, 2023

(87) PCT Pub. No.: WO2022/200348
PCT Pub. Date: Sep. 29, 2022

(65) Prior Publication Data
US 2024/0163586 A1    May 16, 2024

(30) Foreign Application Priority Data
Mar. 26, 2021 (EP) .................................. 21165244

(51) Int. Cl.
*H04N 25/771* (2023.01)
*H04N 25/76* (2023.01)
(Continued)

(52) U.S. Cl.
CPC ....... *H04N 25/771* (2023.01); *H04N 25/7795* (2023.01); *H04N 25/78* (2023.01); *H04N 25/616* (2023.01)

(58) Field of Classification Search
CPC ............... H04N 25/616; H04N 25/771; H04N 25/7795; H04N 25/78
See application file for complete search history.

(56) References Cited

U.S. PATENT DOCUMENTS

| 2010/0207920 A1 | 8/2010 | Chaji et al. |
| 2012/0194715 A1 | 8/2012 | Skaug |

(Continued)

OTHER PUBLICATIONS

Brom et al., "Ramped Capacitor Current Source With Software Controlled Non-Linearity Compensation", Precision Electromagnetic Measurements Digest, 2004 Conference on, IEEE, Jun. 27-Jul. 2, 2004, pp. 66-67.

(Continued)

*Primary Examiner* — Antoinette T Spinks
(74) *Attorney, Agent, or Firm* — XSENSUS LLP

(57) ABSTRACT

An image sensor array includes a pixel circuit that generates a pixel output signal, wherein an amplitude of the pixel output signal is related to an intensity of detected light. The pixel circuit passes the pixel output signal to a data signal line for a selection period. A current control capacitor supplies a current to the data signal line through a first electrode in the selection period. A ramp generator generates a voltage ramp signal and passes the voltage ramp signal to a second electrode of the current control capacitor in the selection period.

15 Claims, 17 Drawing Sheets

(51) Int. Cl.
*H04N 25/78* (2023.01)
*H04N 25/616* (2023.01)

(56) References Cited

U.S. PATENT DOCUMENTS

| | | | |
|---|---|---|---|
| 2014/0209811 A1 | 7/2014 | Chou | |
| 2015/0208008 A1 | 7/2015 | Gendai | |
| 2017/0141685 A1* | 5/2017 | Cannankurichi | ... H02M 3/1563 |
| 2018/0013294 A1* | 1/2018 | Edelson | ............... H03K 17/162 |
| 2018/0152017 A1* | 5/2018 | Langer | ................... H02H 9/025 |
| 2018/0191983 A1 | 7/2018 | Wane et al. | |
| 2019/0123089 A1 | 4/2019 | Doege | |
| 2020/0003874 A1 | 1/2020 | Moriyama | |
| 2020/0260031 A1 | 8/2020 | Ebihara et al. | |

OTHER PUBLICATIONS

International Search Report and Written Opinion mailed on Jun. 29, 2022, received for PCT Application PCT/ EP2022/057484, filed on Mar. 22, 2022, 12 pages.

* cited by examiner

IMAGE SENSOR ARRAY WITH CAPACITIVE CURRENT SOURCE AND SOLID-STATE IMAGING DEVICE COMPRISING THE SAME

CROSS-REFERENCE TO RELATED APPLICATIONS

The present application is based on PCT filing PCT/EP2022/057484, filed Mar. 22, 2022, and claims priority from European Patent Application No. 21165244.1, filed Mar. 26, 2021, the entire contents of each are incorporated herein by reference.

The present disclosure relates to an image sensor array including a column signal processing unit and to a solid-state imaging device. In particular, the disclosure relates to the processing of pixel output signals of pixel circuits.

BACKGROUND

Image sensors in solid-state imaging devices include photoelectric conversion elements generating a photocurrent in proportion to the received radiation intensity. A pixel circuit transforms the small photocurrent generated by the photoelectric conversion element into a comparatively large output voltage which a downstream analog-to-digital converter converts into a digital signal. Typically, the pixel circuit includes the amplifier portion of a source follower circuit (common-drain amplifier) that passes the pixel output signal to a data signal line. The data signal line is shared by a plurality of pixel circuits assigned to the same pixel column and the pixel output signals of the pixel column are output individually in a time multiplex regime. A column signal processing unit sequentially receives and processes the pixel output signals.

It is desirable to further improve the dynamic range of image sensor arrays and to reduce noise effects.

SUMMARY

The source follower circuits connected to the same data signal line share a common constant current source as emitter resistor, wherein the constant current source is typically an nFET (n channel field effect transistor) with constant gate bias. For a linear response of the source follower circuits, the nFET is operated in the saturation region. Operation in the saturation region requires that a voltage drop between drain and emitter of the nFET is greater than a minimum voltage, e.g. greater than 300 mV to 400 mV.

The present disclosure mitigates shortcomings of image sensor arrays for intensity read-out attributed to the constant current sources used for pixel read-out.

To this purpose, an image sensor array according to the present disclosure includes a pixel circuit that generates a pixel output signal, wherein an amplitude of the pixel output signal is related to an intensity of detected light. The pixel circuit passes the pixel output signal to a data signal line for a selection period. A current control capacitor supplies a current to the data signal line through a first electrode in the selection period. A ramp generator generates a voltage ramp signal and passes the voltage ramp signal to a second electrode of the current control capacitor in the selection period A solid-state imaging device according the present disclosure includes a plurality of pixel circuits, wherein each pixel circuit generates a pixel output signal with an amplitude related to an intensity of detected light. Each pixel circuit is assigned to one of a plurality of pixel columns. The solid-state imaging device further includes a plurality of data signal lines and a plurality of current control capacitors. Each data signal line receives the pixel output signals of a plurality of pixel circuits assigned to a same pixel column. A selected one of the pixel circuits passes the pixel output signal to the data signal line for a selection period. Each current control capacitor supplies a current to one of the data signal lines through a first electrode in the selection period. A ramp generator generates a voltage ramp signal and passes the voltage ramp signal to second electrodes of the current control capacitors in the selection period.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Embodiments for implementing techniques of the present disclosure (also referred to as "embodiments" in the following) will be described below in detail using the drawings. The techniques of the present disclosure are not limited to the described embodiments, and various numerical values and the like in the embodiments are illustrative only. The same elements or elements with the same functions are denoted by the same reference signs. Duplicate descriptions are omitted.

Connected electronic elements may be electrically connected through a direct, permanent low-resistive connection, e.g., through a conductive line. The terms "electrically connected" and "signal-connected" may also include a connection through other electronic elements provided and suitable for permanent and/or temporary signal transmission and/or transmission of energy. For example, electronic elements may be electrically connected or signal-connected through resistors, capacitors, and electronic switches such as transistors or transistor circuits, e.g. MOSFETs, transmission gates, and others.

The load path of a transistor is the controlled path of a transistor. For example, a voltage applied to a gate of a field effect transistor (FET) controls by field effect the current flow through the load path between source and drain.

Though in the following a technology for increasing dynamic range for pixel sensors is described in the context of certain types of active image sensors for intensity readout, the technology may also be used for other types of image sensors.

Figure 1:
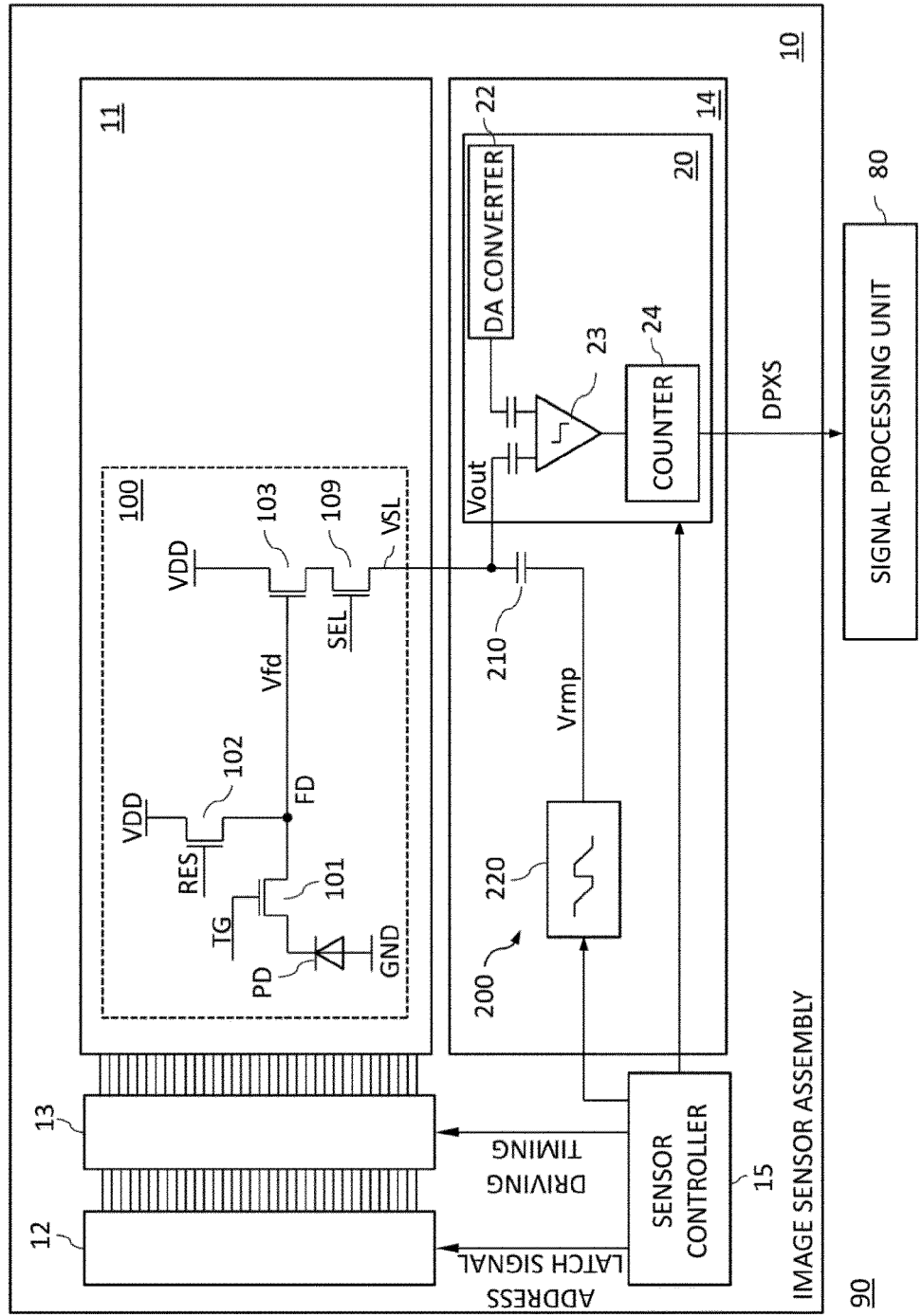
FIG. 1 is a simplified block diagram illustrating an embodiment of a solid-state imaging device according to an embodiment of the present technology.

FIG. 1 illustrates a configuration example of a solid-state imaging device 90 including an image sensor assembly 10 and a signal processing unit 80 according to an embodiment of the present technology.

The image sensor assembly 10 may include a pixel array unit 11, a row decoder 12, a pixel driver unit 13, a column signal processing unit 14, and a sensor controller 15.

The pixel array unit 11 includes a plurality of pixel circuits 100. Each pixel circuit 100 includes a photoelectric conversion element PD and a number of FETs (field effect transistors) for controlling the signal output by the photoelectric conversion element PD. The photoelectric conversion devices PD may be arranged matrix-like in columns and rows. A subset of pixel circuits 100 assigned to the same column of photoelectric conversion devices PD forms a pixel column. The outputs of the pixel circuits 100 of the same pixel column are successively supplied to a data signal line (vertical signal line) VSL.

The row decoder 12 and the pixel driver unit 13 control driving of each pixel circuit 100 disposed in the pixel array unit 11. In particular, the row decoder 12 may supply a control signal for selecting the pixel circuit 100 or the row of pixel circuits 100 to be driven to the pixel driver unit 13 according to an address signal from the sensor controller 15. The pixel driver unit 13 may drive the FETs of the selected pixel circuit 100 according to driver timing signals supplied from the sensor controller 15 and the control signal supplied from the row decoder 12.

The data signal lines VSL pass the output signals of the pixel circuits 100 (pixel output signals Vout) to the column signal processing unit 14.

For pixel circuits 100 implementing intensity readout, the column signal processing unit 14 may include one or more ADCs (analog-to-digital converters 20. The column signal processing unit 14 may include as much ADCs 20 as the pixel army unit 11 includes data signal lines VSL. Alternatively, the number of ADCs 20 may be lower than the number of data signal lines VSL and each ADC 20 may be multiplexed between two or more of the data signal lines VSLs. Each ADC 20 performs an analog-to-digital conversion on the pixel output signals successively passed from the pixel column and passes digital pixel data DPXS to the signal processing unit 80. To this purpose, each ADC 20 may include a comparator 23, a digital-to-analog converter 22 and a counter 24.

The sensor controller 15 controls the components of the image sensor assembly 10. For example, the sensor controller 15 may generate and pass the address to the row decoder 12, and may generate and pass driving timing signals to the pixel driver unit 13. In addition, the sensor controller 15 may generate and pass one or more control signals to the column signal processing unit 14, e.g. to the ADCs 20.

The pixel circuits 100 may be any active pixel sensors for intensity readout. The illustrated example refers to pixel circuits 100 for intensity readout with one photoelectric conversion element PD and four transistors (FETs) as active elements.

The photoelectric conversion element PD may include or may be composed of, for example, a photodiode. The FETs may include a transfer transistor 101, a reset transistor 102, an amplification transistor 103, and a selection transistor 109.

The photoelectric conversion element PD photoelectrically converts incident electromagnetic radiation into electric charges. The amount of electric charge generated in the photoelectric conversion element PD corresponds to the intensity of the incident electromagnetic radiation. For example, the photoelectric conversion element PD may include or consist of a photodiode which converts electromagnetic radiation incident on a detection surface into a detector current by means of the photoelectric effect. The electromagnetic radiation may include visible light, infrared radiation and/or ultraviolet radiation. The amplitude of the detector current corresponds to the intensity of the incident electromagnetic radiation, wherein in the intensity range of interest the detector current increases approximately linearly with increasing intensity of the detected electromagnetic radiation.

The transfer transistor 101 is connected between the photoelectric conversion element PD and a floating diffusion region FD. The transfer transistor 101 serves as transfer element for transferring charge from the photoelectric conversion element PD to the floating diffusion region FD. The floating diffusion region FD serves as temporary local charge storage. A transfer signal TG serving as a control signal is supplied to the gate (transfer gate) of the transfer transistor 101 through a transfer control line. Thus, the transfer transistor 101 may transfer electrons photoelectrically converted by the photoelectric conversion element PD to the floating diffusion region FD.

The reset transistor 102 is connected between the floating diffusion region FD and a power supply line to which a positive supply voltage VDD is supplied. A reset signal RES serving as a control signal is supplied to the gate of the reset transistor 102 through a reset control line. Thus, the reset transistor 102 serving as a reset element resets a floating diffusion potential Vfd of the floating diffusion region FD to that of the power supply line supplying the positive supply voltage VDD.

The floating diffusion region FD is connected to the gate of the amplification transistor 103 serving as an amplification element. The floating diffusion region FD functions as the input node of the amplification transistor 103.

The amplification transistor 103 and the selection transistor 109 are connected in series between the power supply line and the data signal line VSL. Thus, the amplification transistor 103 is connected to the data signal line VSL through the selection transistor 109.

A selection signal SEL serving as a control signal corresponding to an address signal is supplied to the gate of the selection transistor 109 through a selection control line, and turns on the selection transistor 109. When the selection transistor 109 is turned on, the amplification transistor 103 amplifies the floating diffusion potential Vfd of the floating diffusion region FD and outputs a voltage corresponding to the floating diffusion potential Vfd to the data signal line VSL. The data signal line VSL passes the pixel output signal Vout from the pixel circuit 100 to the column signal processing unit 14.

Since the respective gates of the transfer transistor 101, the reset transistor 102, and the selection transistor 109 are, for example, connected in units of pixel rows, these operations may be simultaneously performed for each of the pixel circuits 100 of one pixel row.

The data signal line VSL is further connected to a constant current circuit 200 that includes a current control capacitor 210 and a ramp generator 220 controlled by the sensor controller 15. The constant current circuit 200 may be configured to be effective as switched capacitor current source supplying at least temporarily a constant current to the data signal line VSL.

The amplifier transistor 103 of the pixel circuit 100 and the constant current circuit 200 complement to a source follower circuit passing a pixel output signal Vout derived from the floating diffusion potential Vfd to the column signal processing unit 14 and the ADCs 20. The ADCs 20 transform the received pixel output signals Vout into digital pixel data DPXS and pass the digital pixel data DPXS to the signal processing unit 80.

Figure 2:
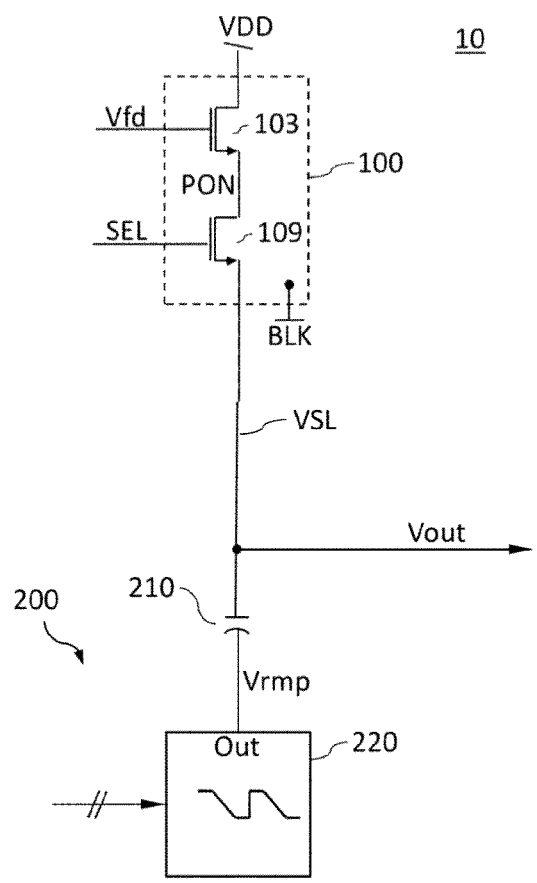
FIG. 2 is a simplified block diagram illustrating a configuration example of a part of an image sensor array including a current control capacitor with a first electrode connected to a data signal line and with a second electrode receiving a voltage ramp signal according to an embodiment.

FIG. 2 refers to details of an image sensor array 10 according to the present disclosure.

The image sensor array 10 includes a pixel circuit 100 that generates a pixel output signal Vout with an amplitude related to an intensity of detected light and passes the pixel output signal Vout to a data signal line VSL for a selection period. A current control capacitor 210 supplies a current to the data signal line VSL through a first electrode in the selection period. A ramp generator 220 generates a voltage ramp signal Vrmp and passes the voltage ramp signal Vrmp to a second electrode of the current control capacitor 210 in the selection period.

In particular, the pixel circuit 100 may include an amplification transistor 103 with a load path connected between a positive supply voltage VDD and a pixel output node PON. A floating diffusion region may be connected to a gate of the amplification transistor 103. A floating diffusion potential Vfd may be passed to the gate of the amplification transistor 103 and controls the amplification transistor 103.

A selection transistor 109 is connected with a load path between the pixel output node PON and the data signal line VSL. A gate of the selection transistor 109 receives a selection signal SEL. The selection signal SEL is active ("on") and turns on the selection transistor 109 for a selection period. Outside the selection period, the selection signal SEL is inactive ("off") and turns off the selection transistor 109.

The substrate bulk for the amplification transistor 103 and the selection transistor 109 is connected to a bulk potential BLK. The bulk potential BLK may be connected to a voltage reference potential GND or to a negative potential.

A first electrode of the current control capacitor 210 (first control capacitor electrode) is signal-connected to the data pixel circuit 100 through the data signal line VSL. The first control capacitor electrode may be directly connected to the pixel circuit 100. Alternatively, further elements or circuits facilitating at least temporary signal transmission such as FETs, switches and/or resistors may be electrically connected between the pixel circuit 100 and the first control capacitor electrode and signal-connect the pixel circuit 100 with the first control capacitor electrode in at least a part of the selection period.

The ramp generator 220 generates a voltage ramp signal Vrmp in response to one or more control signals received from the sensor controller and outputs the voltage ramp signal Vrmp at a ramp generator output Out. The ramp generator output Out is signal-connected to the second electrode of the current control capacitor 210 (second control capacitor electrode). The ramp generator output Out and the second control capacitor electrode may be directly connected. Alternatively, further elements or circuits allowing at least temporary signal transmission such as FETs, switches and/or resistors may be connected between the ramp generator output Out and the second control capacitor electrode and connect the ramp generator output Out with the second control capacitor electrode for at least a part of the selection period.

When a first capacitor electrode of a capacitor with a capacitance C is kept at constant voltage level while a voltage ramp with a constant slope ratio Vrmp/Trmp is applied to a second capacitor electrode, the first capacitor electrode supplies a constant current $Ic=(Vrmp*C)/Trmp$ to the circuit connected to the first capacitor electrode.

In particular, during the selection period the amplification transistor 103 forces the voltage level of the pixel output signal Vout on the data signal line VSL to a level that is a function of the floating diffusion potential Vfd provided that a current source supplies a constant current to the data signal line VSL. The current control capacitor 210 supplies the required constant current to the data signal line VSL through the first control capacitor electrode provided that simultaneously a sufficiently steep voltage ramp is supplied to the second control capacitor electrode.

The constant current circuit 200 and in particular the current control capacitor 210 and the amplification transistor 103 complement each other to a source follower circuit, wherein the current control capacitor 210 is effective as the constant current source for the output current.

Figure 3:
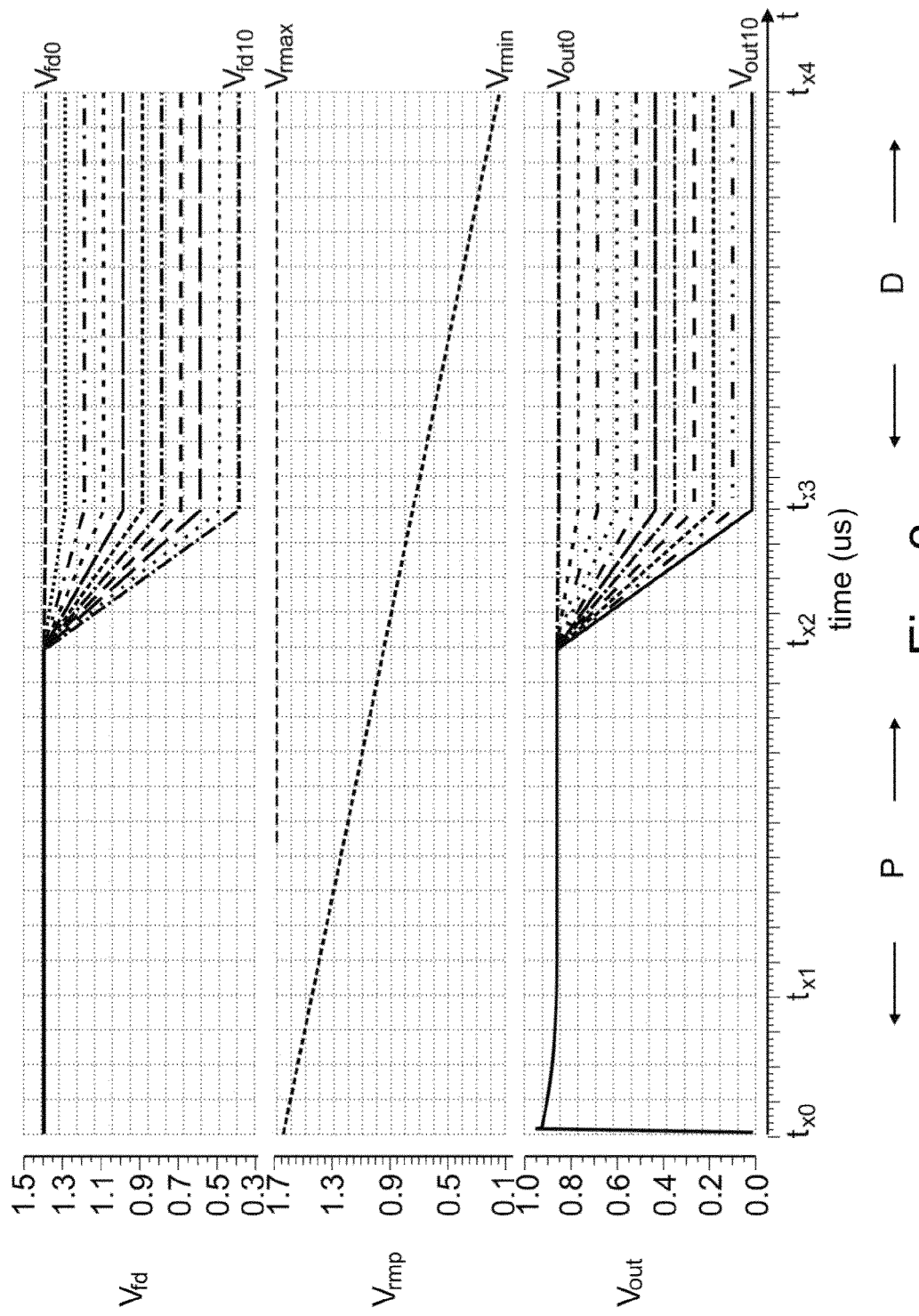
FIG. 3 includes time charts for discussing effects of the embodiments on pixel output signals on the data signal line.

The time charts in FIG. 3 show the effect of the constant current circuit 200 of FIG. 2. The upper time chart (first time chart) shows a time response of the floating diffusion potential Vfd. The second time chart shows the voltage ramp signal Vrmp. The third time chart shows the resulting pixel output signal Vout on the data signal line VSL. The pixel circuit may be continuously selected from t=tx0 to t=tx4.

In general, one pixel readout cycle may include a preset phase P and a data phase D. A voltage level of the pixel output signal Vout at the end of the preset phase P may indicate a current pixel offset voltage obtained as output signal of a pixel circuit with unilluminated photoelectric conversion element PD ("dark pixel"). A voltage level of the pixel output signal Vout at the end of the data phase D is a measure for incident light on the illuminated photoelectric conversion element PD. For CDS (correlated double sampling), the kTC noise may be canceled by subtracting the current pixel offset voltage obtained in the preset phase P from the pixel output signal Vout at the end of the data phase D. A settling time after which the voltage level of the pixel output signals Vout is stable after transitions to the preset phase P and to the data phase D determines the readout speed.

At t=tx0 the floating diffusion region is connected to a constant reset potential. For example, the reset transistor 102 shown in FIG. 1 may connect the floating diffusion region to the high supply voltage VDD. Accordingly, the floating diffusion potential Vfd is equal to a reset potential. The reset potential may be about 1.4V.

Prior to tx0, at t=tx0, or shortly later the voltage ramp signal Vrmp supplied to the second control capacitor electrode starts to drop at constant rate. The slope ratio of the voltage ramp is equal to 1V/μs and the capacitance C of the current control capacitor 210 in FIG. 2 is 5 pF such that the current control capacitor 210 supplies a constant current of 5 μA to the data signal line VSL.

At t=tx1, after a settling time of 200 ns to 300 ns, the pixel output signal Vout reaches a constant voltage level that depends on the reset potential of the floating diffusion region.

At t=tx2 the floating diffusion region is disconnected from the constant reset potential and connected to the photoelectric conversion element of the pixel circuit. The floating diffusion potential Vfd adapts according to the intensity of radiation detected by the photoelectric conversion element and reaches the corresponding final constant voltage level at t=tx3. The different floating diffusion potentials Vfd1, . . . , Vfd10 correspond to different illumination conditions, wherein the intensity of detected radiation increases from Vfd1 to Vfd10 and wherein Vfd1 is the floating diffusion potential of an unexposed pixel (dark pixel) and Vfd10 is the floating diffusion potential of a fully exposed pixel.

From t=tx0 to t=tx4 the constant current circuit 200 steadily supplies a constant current of 5 μA such that the pixel output signal Vout follows the floating diffusion potential Vfd accordingly and reaches constant voltage levels for the different illumination conditions at t=tx3.

The lower limit of the output voltage swing for the pixel output signal Vout (pixel output voltage swing) is given by the bulk potential BLK to which the substrate bulks of the amplification transistor 103 and the selection transistor 109 are connected. In case the bulk potential BLK corresponds to the voltage reference potential GND (0V), the lower limit of the pixel output voltage swing is equal to 0V.

In comparison with a conventional constant current source based on an nFET with constant gate bias, the constant current circuit 200 of FIG. 2 provides a capacitor current source that increases the voltage swing of the pixel output voltage Vout by 300 mV to 400 mV, in other words, by about 40%. The increased pixel output voltage swing in turn facilitates a higher voltage swing for the floating diffusion potential Vfd and eventually a higher dynamic range. The pixel output voltage swing may be further increased by supplying a negative potential as bulk potential BLK.

Further in comparison with a conventional constant current source based on an nFET with constant gate bias, the capacitor current source eliminates the 1/f and RTS (random telegraph signal) noise inherently introduced by the operation of FETs.

Figure 4:
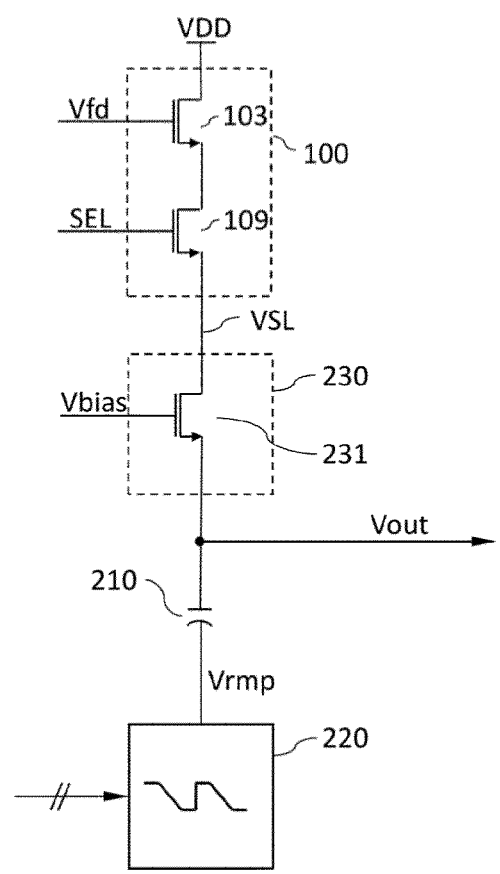
FIG. 4 is a simplified circuit diagram illustrating a configuration example of a part of an image sensor array according to an embodiment including an n channel common gate transistor for reducing the capacitive load on the data signal line.

FIG. 4 shows a capacitance control circuit 230 connected between the data signal line VSL and the current control capacitor 210. The capacitance control circuit 230 includes an n channel common gate transistor for reducing a capacitive load effective for the pixel output signal Vout.

In particular, if the capacitance Cramp of the current control capacitor 210 is large compared to the capacitance of the data signal line VSL, the capacitance control circuit 230 may be efficient to reduce the settling time, i.e. the time elapsed until the pixel output signal Vout reaches a specified error band around the final voltage level after a voltage transition. The capacitance control circuit 230 may include any circuit that reduces the capacitive load on the data signal line VSL.

For example, the capacitance control circuit 230 may include at least one FET 231, wherein a load path of the FET 231 is connected between the pixel circuit 100 and the first electrode of the current control capacitor 210.

In the illustrated embodiment, the capacitance control circuit 230 includes one nFET 231 with constant gate bias Vbias.

Figure 5:
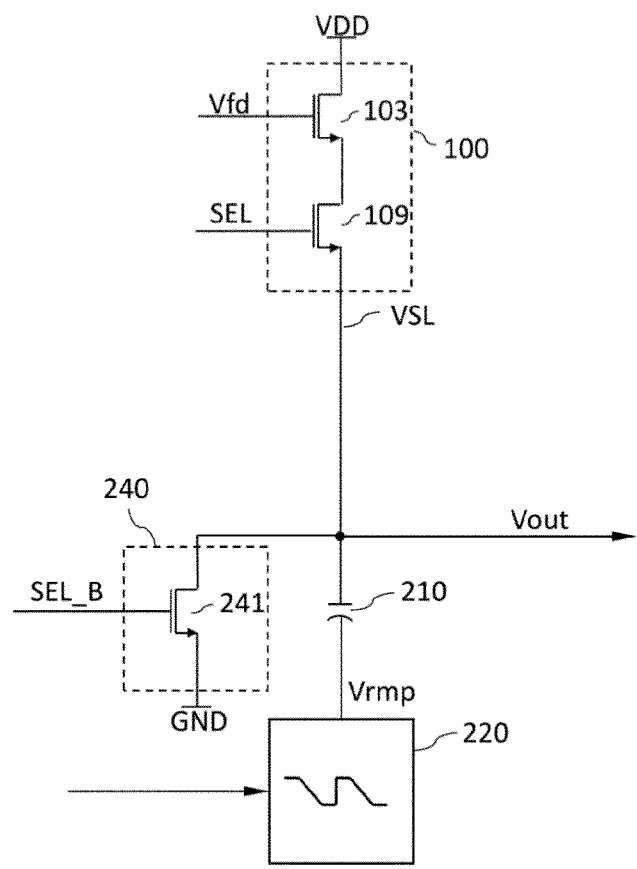
FIG. 5 is a simplified circuit diagram illustrating a configuration example of a part of an image sensor array according to an embodiment including a pre-charge circuit for the data signal line.

FIG. 5 shows a pre-charge circuit 240 that pre-charges the data signal line VSL in a pre-charge period outside the selection period.

The data signal line VSL may be pre-charged to a constant voltage lower than the positive supply voltage VDD, for example to the voltage reference potential GND. The pre-charge circuit 240 may be active in pre-charge periods prior to settling phases, e.g. prior to each selection period. The pre-charge circuit 240 is inactive for the selection periods.

By pre-charging the data signal line VSL with the voltage reference potential GND, the settling of the pixel output signal Vout concerns a transition from a low voltage to a high voltage. The transition from the low voltage to the high voltage is governed by the source follower configuration including the amplification transistor such that the output load is driven by the comparatively high source follower current. Otherwise, if the data signal line VSL is pre-charged with high potential, the settling of the pixel output signal Vout concerns transitions form a high voltage to a low voltage, wherein the output load is driven by the comparatively low current supplied by the constant current circuit 200.

Therefore, in particular if the capacitance Cramp of the current control capacitor 210 is small compared to the capacitance of the data signal line VSL, by pre-charging the data signal line VSL prior to the preset phase P and prior to the data phase D with the voltage reference potential GND, the pre-charge circuit 240 may efficiently reduce, for a given constant current supplied by the current control capacitor 210, the settling time, i.e. the time elapsed until the pixel output signal Vout reaches a specified error band around the final voltage level after a voltage transition.

The pre-charge circuit 240 may include a first switching element 241 that passes the voltage reference potential GND to the data signal line VSL in the pre-charge period. A pre-charge control signal SEL_B may control the first switching element 241.

The pre-charge circuit 240 may be configured to start each pre-charge period with end of a preceding selection period and to end each pre-charge period with start of a following selection period.

The selection periods at the data signal line VSL may concern different pixel circuits which are assigned to the same data signal line VSL and selected with different select signals.

Figure 6:
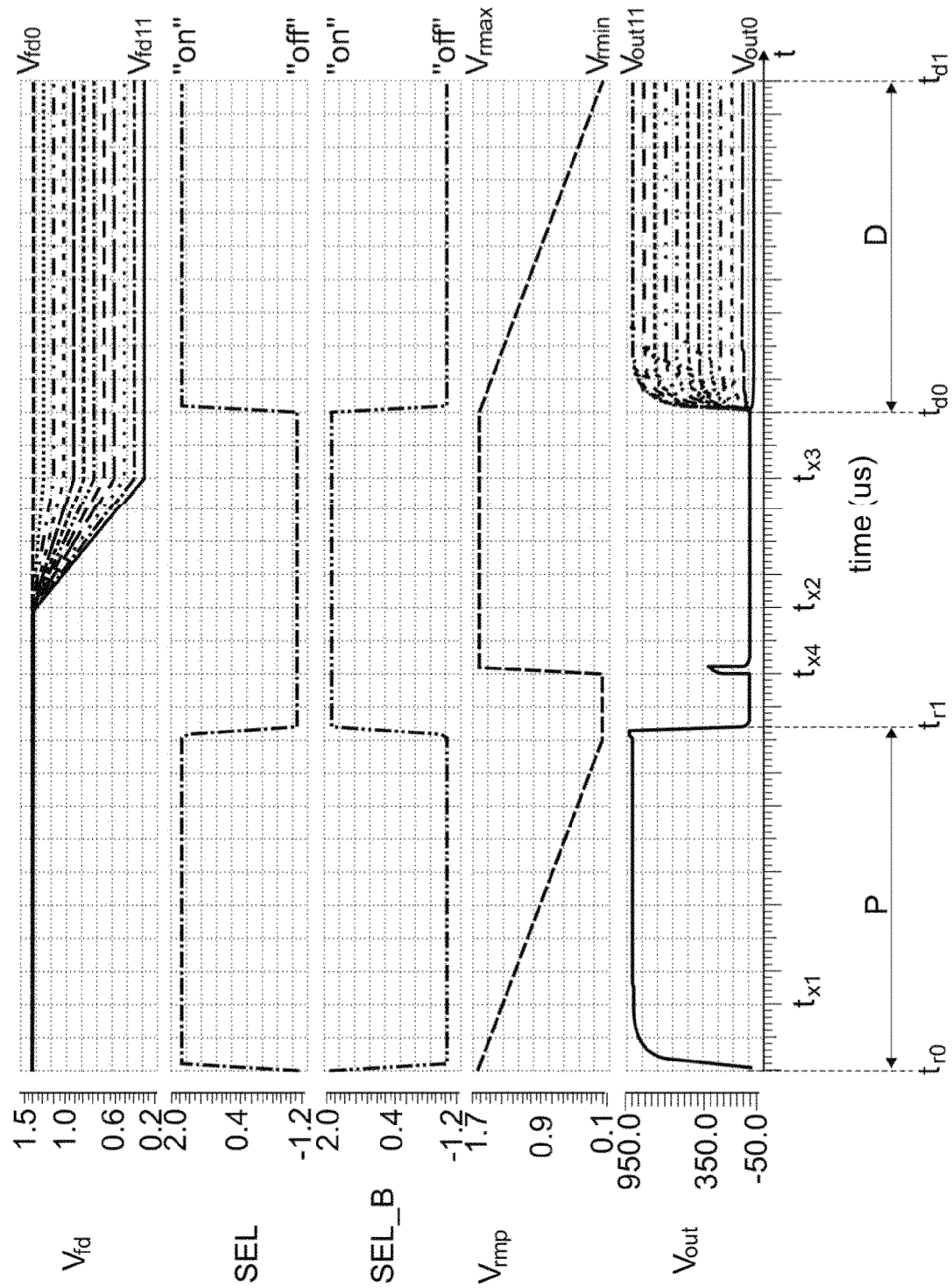
FIG. 6 includes time charts for discussing effects of the embodiments on pixel output signals on the data signal line during reset and data phases.

The time charts in FIG. 6 illustrate the effect of the pre-charge circuit 240 of FIG. 5. The upper time chart (first time chart) shows a time response of the floating diffusion potential Vfd. The second time chart shows a time response of the selection signal SEL. The third time chart shows a time response of the pre-charge signal SEL_B. For simplicity, one single pixel circuit per data signal line is considered in this example, wherein the pre-charge control signal SEL_B may be approximated by the inverted selection signal SEL. The fourth time chart shows the voltage ramp signal Vrmp. The fifth time chart shows the resulting pixel output signal Vout on the data signal line VSL.

Active periods of the selection signal SEL define selection periods. A first selection period defines a preset phase P between t=tr0 and t=tr1. A second selection period defines a data phase D between t=td0 and t=td1.

In the preset phase P, the floating diffusion region is connected to a constant reset potential, e.g., to the high supply voltage VDD. Starting with begin of the preset phase P, the voltage ramp signal Vrmp drops at constant rate. The slope ratio of the voltage ramp may be set such that within the preset phase P the voltage ramp signal drops form a maximum ramp voltage Vrmax to a minimum ramp voltage Vrmin. At t=tx the pixel output signal Vout reaches a constant voltage level that depends on the reset potential of the floating diffusion region. The slope ratio of the voltage ramp is equal to 3V/µs and the capacitance C of the current control capacitor 210 in FIG. 5 is 1 pF such that the current control capacitor 210 supplies a constant current of 3 µA.

At t=tr1 the preset phase P ends. The selection signal SEL becomes inactive and disconnects the pixel circuit 100 from the data signal line VSL. The pre-charge control signal SEL_B turns on the first switching element 241 and connects the data signal line VSL to the voltage reference potential GND, wherein the data signal line VSL is pre-charged with the voltage reference potential GND. At t=ty the ramp voltage signal Vrmp returns to the maximum ramp voltage Vrmax.

Starting with t=tx2 floating diffusion potential Vfd adapts according to the intensity of radiation detected by the photoelectric conversion element and reaches the corresponding final constant level at t=tx3. Different floating diffusion potentials Vfd1, . . . , Vfd11 result from different illumination conditions, wherein the intensity of detected radiation increases from Vfd1 to Vfd11.

Starting with begin of the data phase D at t=td0, the voltage ramp signal Vrmp again drops at the same rate as in the preset phase P.

During both the preset phase P and the data phase D the constant current circuit 200 steadily supplies a constant current of 3 µA such that the pixel output signal Vout follows the floating diffusion potential Vfd accordingly and reaches constant voltage levels for the different illumination conditions at t=tx3.

Figure 7:
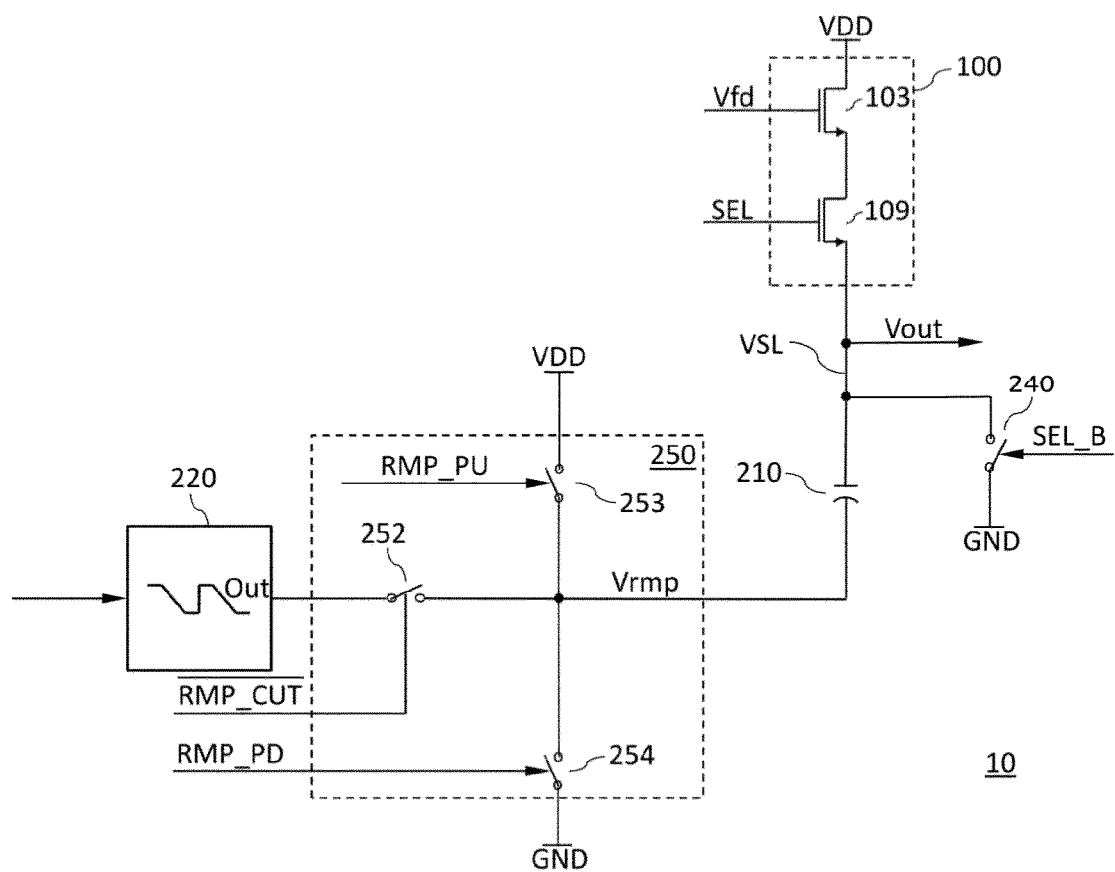
FIG. 7 is a simplified circuit diagram illustrating a configuration example of a part of an image sensor array according to an embodiment including a capacitor control circuit for controlling the current control capacitor.

FIG. 7 shows a part of an image sensor array 10 including a capacitor control circuit 250 that decouples the second electrode of the current control capacitor 210 from an output of the ramp generator 220 in an initial phase at a start of the selection period and/or in a tail phase at an end of the selection period.

The initial phase may start shorty prior to, simultaneously with of shortly after the start of the selection period and ends within the selection period, e.g. within the first quarter of the selection period. The trail phase may start shortly prior to, simultaneously with of shortly after the end of the selection period and ends before the next selection period.

The capacitor control circuit 250 may reduce or eliminate detrimental interaction between components of the constant current circuit 200 and other circuits connected to the data signal line VSL. For example, the capacitor control circuit 250 may be adapted to reduce effects caused by turning on and/or off the selection transistor 109 on the ramp generator 220.

In particular, the capacitor control circuit 250 may include a second switching element 252 configured to disconnect the second electrode of the current control capacitor 210 from the output Out of the ramp generator 220 for the initial phase of the selection period and/or for the tail phase. A first ramp control signal RMP_CUT may control the second switching element 252.

In particular, the first ramp control signal RMP_CUT may be active during the switching transitions of the selection transistor 109 such that the output Out of the ramp generator 220 is disconnected from the current control capacitor 210 during the switching transitions and current spikes on the ramp generator 200 can be reduced. In particular, the ramp generator can be protected from receiving current spikes, in particular from current spikes with transition currents higher than the maximum ramp generator output current.

The second switching element 252 may be an FET with a load path connected between the output Out of the ramp generator 220 and the second electrode of the current control capacitor 210. The first ramp control signal RMP_CUT may be passed to the gate of the FET.

The capacitor control circuit 250 may include a third switching element 253 that passes a first constant voltage to the second electrode of the current control capacitor 210 in the initial phase of the selection period. The third switching 253 element pushes the second electrode of the current control capacitor 210 to an appropriate constant potential for the time the current control capacitor 210 is disconnected from the ramp generator 220. The first constant voltage may be a high potential, e.g. the positive supply voltage VDD.

A second ramp control signal RMP_PU controls the third switching element 253. The third switching element 253 may be an FET with a load path connected between the positive supply voltage VDD and the second electrode of the current control capacitor 210. The second ramp control signal RMP_PU may be passed to the gate of the FET.

The capacitor control circuit 250 may include a fourth switching element 254 configured to pass a second constant voltage to the second electrode of the current control capacitor 210 in the trail phase at the end of the selection period. The fourth switching element 254 element pulls the second electrode of the current control capacitor 210 to an appropriate constant potential for the time the current control capacitor 210 is disconnected from the ramp generator 220.

The second constant voltage may be a low potential, e.g. the voltage reference potential GND.

A third ramp control signal RMP_PD controls the fourth switching element 254. The fourth switching element 254 may be an FET with a load path connected between the voltage reference potential GND and the second electrode of the current control capacitor 210. The third ramp control signal RMP_PD may be passed to the gate of the FET.

Figure 8:
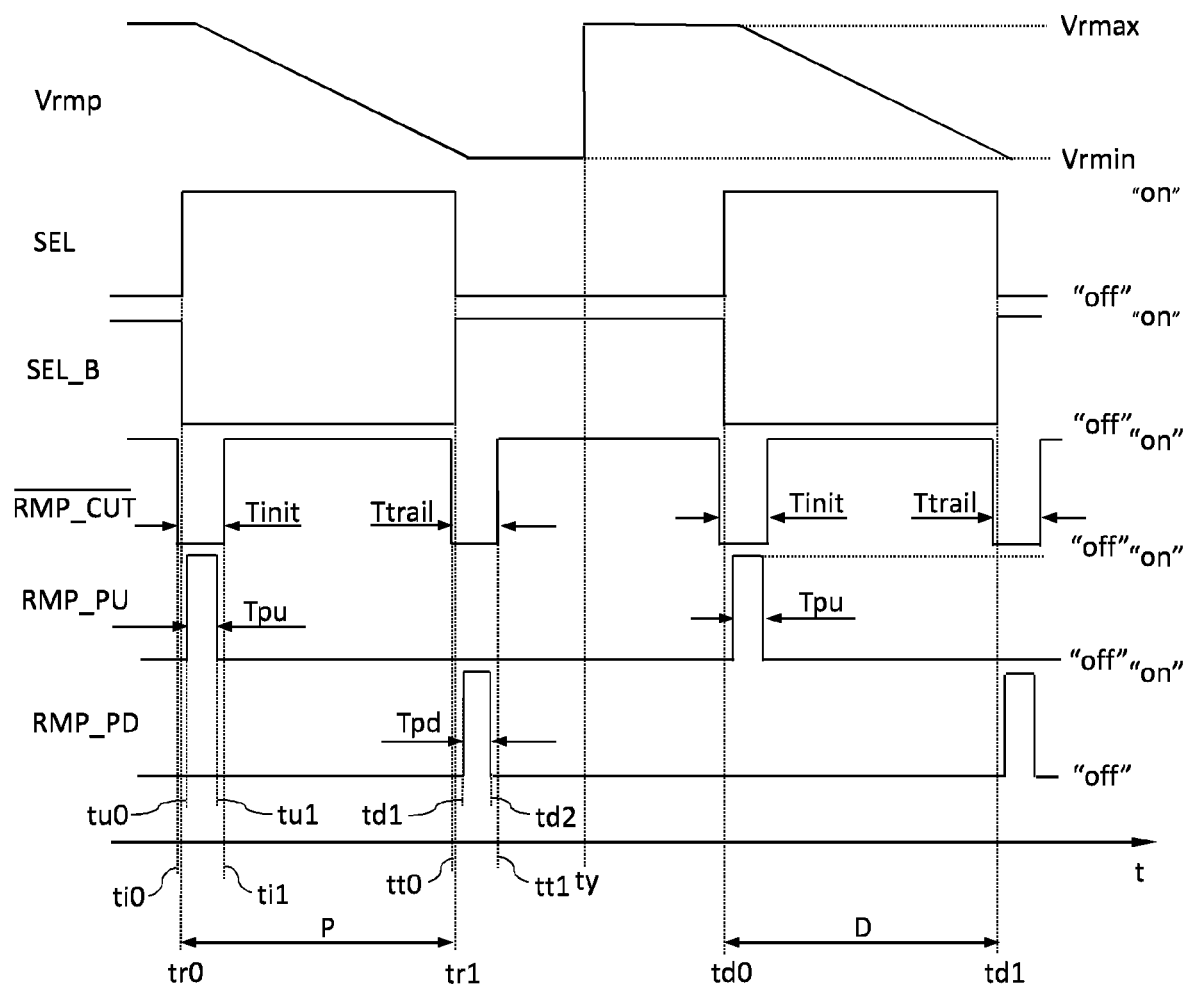
FIG. 8 includes simplified time charts for discussing effects of the embodiment of FIG. 7.

FIG. 8 shows the time charts for a voltage ramp signal Vrmp, the selection signal SEL and the pre-charge control signal SEL_B as described with reference to FIG. 6, and for the first ramp control signal RMP_CUT, the second ramp control signal RMP_PU, and the third ramp control signal RMP_PD.

The first ramp control signal $\overline{\text{RMP\_CUT}}$ is inactive and switches off the second switching element 252 for initial phases Tinit and for trail phases Ttrail. The initial phases Tinit start at t=ti0 prior to begin of the selection periods P, D at t=tr0 and t=td0 and end at t=ti1 shortly after begin of the selection periods P, D. The trail phases Ttrail start at t=tt0 prior to the end of the selection periods P, D at t=tr1 and t=td1 and end at t=tt1 after the end of the selection periods P, D and prior to the next selection period. Outside the initial phases Tinit and the trail phases Ttrail, the first ramp control signal $\overline{\text{RMP\_CUT}}$ is active and the second switching element 252 is on.

The second ramp control signal RMP_PU is active and switches on the third switching element 253 for pull-up phases Tpu. Each pull-up phase Tpu starts at t=tu0 with or after begin of an initial phase Tinit and ends at t=tu1 shortly prior to or with the end of the initial phase Tinit. Outside the pull-up phases Tpu, the second ramp control signal RMP_PU is inactive and the third switching element 253 is off.

The third ramp control signal RMP_PD is active and switches on the fourth switching element 254 for pull-down phases Tpd. Each pull-down phase Tpd starts at t=tp0 with or after begin of a trail phase Ttrail and ends at t=tp1 shortly prior to or with the end of the trail phase Ttrail. Outside the pull-down phases Tpd, the fourth ramp control signal RMP_PD is inactive and the fourth switching element 254 is off.

The ramp generator 220 may be any circuit that creates or approximates a linear rising or falling voltage with respect to time. For example, the ramp generator 220 may include an analog ramp generator like a bootstrap ramp generator using an operational amplifier in a voltage follower configuration. According to another example, the ramp generator includes a DAC (digital-to-analog converter stage) generating a stair step voltage ramp.

Figure 9:
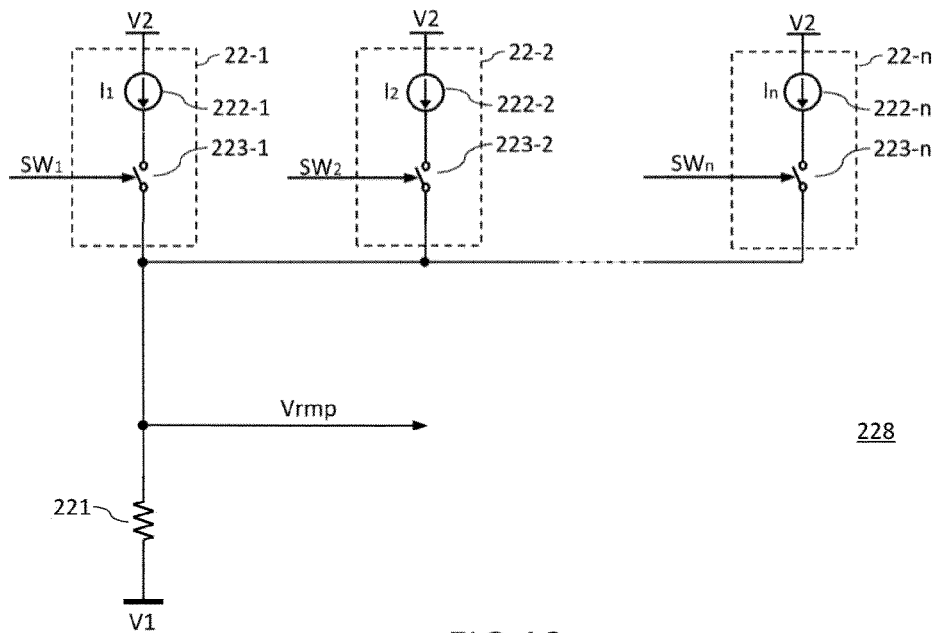
FIG. 9 is a simplified circuit diagram illustrating a part of a ramp generator according to an embodiment, for which generating the voltage ramp signal includes digital-to-analog conversion.

FIG. 9 shows a ramp generator 220 that includes a DAC stage 228 with a plurality of switchable current supply cells 22-1, ..., 22-*n* connected in parallel and an output resistor 221. Each current supply cell 22-1, ..., 22-*n* includes a cell current source 222-1, ..., 222-*n* and a primary switching element 223-1, ..., 223-*n* connected in series. The output resistor 221 is connected in series between the parallel connected current supply cells 22-1, ..., 22-*n* and a first constant voltage V1. The parallel connected current supply cells 22-1, ..., 22-*n* are connected in series between a second constant voltage V2 and the output resistor 221.

When the primary switching element 223-*x* of a switchable current supply cell 22-*x* is on, the respective cell current source 222-*x* induces a current flow between the first constant voltage V1 and the second constant voltage V2 through the output resistor 221.

The current supply cells 22-1, ..., 22-*n* may include FETs with constant gate bias, may be essentially identical and may supply the same current. The primary switching elements 223-1, ..., 223-*n* may be FETs. Switch control signals Sw1, ..., Swn control the primary switching elements 223-1, ..., 223-*n* and turn on selected ones. The switch control signals Sw1, Swn control the current supply cells 22-1, ..., 22-*n* in a way that the sum current through the output resistor 221 continuously increases or decreases with time in steps at a step height corresponding to the voltage drop one single of the cell current sources 222-1, ..., 222-*n* generates at the output resistor 221.

Figure 10:
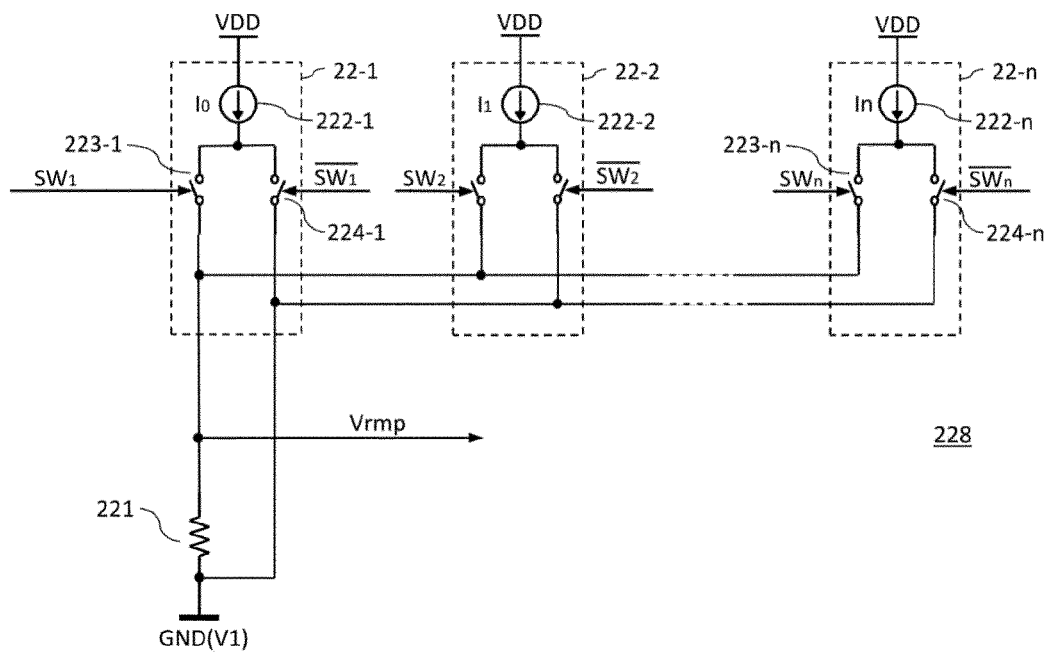
FIG. 10 is a simplified circuit diagram illustrating a part of a ramp generator according to another embodiment for which generating the voltage ramp signal includes digital-to-analog conversion.

In the DAC stage 228 illustrated in FIG. 10 each switchable current cell 22-1, ..., 22-*n* further includes a secondary switching element 224-1, ..., 224-*n* connected in series between the cell current source 222-1, ..., 222-*n* and the first constant voltage V1. The inverted switch control signals $\overline{\text{Sw1}}$, ..., $\overline{\text{Swn}}$ control the secondary switching elements 224-1, ..., 224-*n* and turn on selected ones such that during operation each cell current source 222-1, ..., 222-*n* supplies the same current at any time and the total current consumption remains constant.

The illustrated DAC stage 228 refers to a ground-based type DAC stage, wherein the first constant voltage V1 is equal to the voltage reference potential GND and the second constant voltage V2 is equal to the positive supply voltage VDD. According to a DAC stage of the supply-based type, the switchable current cells 22-1, ..., 22-*n* may be connected to the voltage reference potential GND and the output resistor 221 may be connected to the positive supply voltage VDD.

Figure 11:
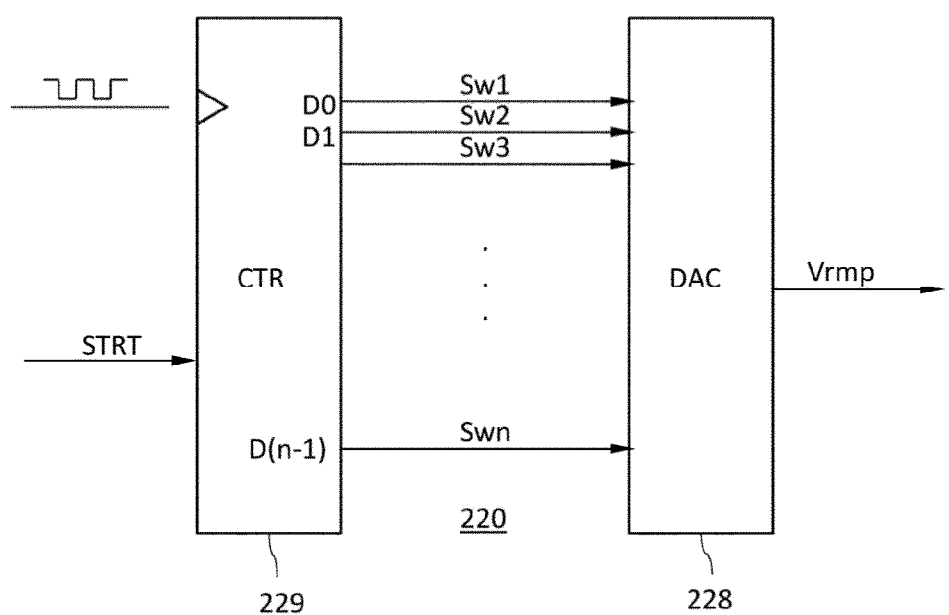
FIG. 11 is a simplified circuit diagram illustrating a configuration example of a ramp generator including a counter unit.

FIG. 11 shows a ramp generator 220 that includes a counter 229 controlling the switchable current supply cells 22-1, ..., 22-*n* of any of the DAC stages 228 in FIG. 9 or FIG. 10. The counter 229 may be a binary counter, increasing a digital count value with each rising or trailing edge of a clock signal and outputting the current digital count value in parallel at data outputs D0, ..., Dn−1. The data outputs D0, ..., Dn−1 supply the switch control signals Sw1, ..., Swn.

Figure 12:
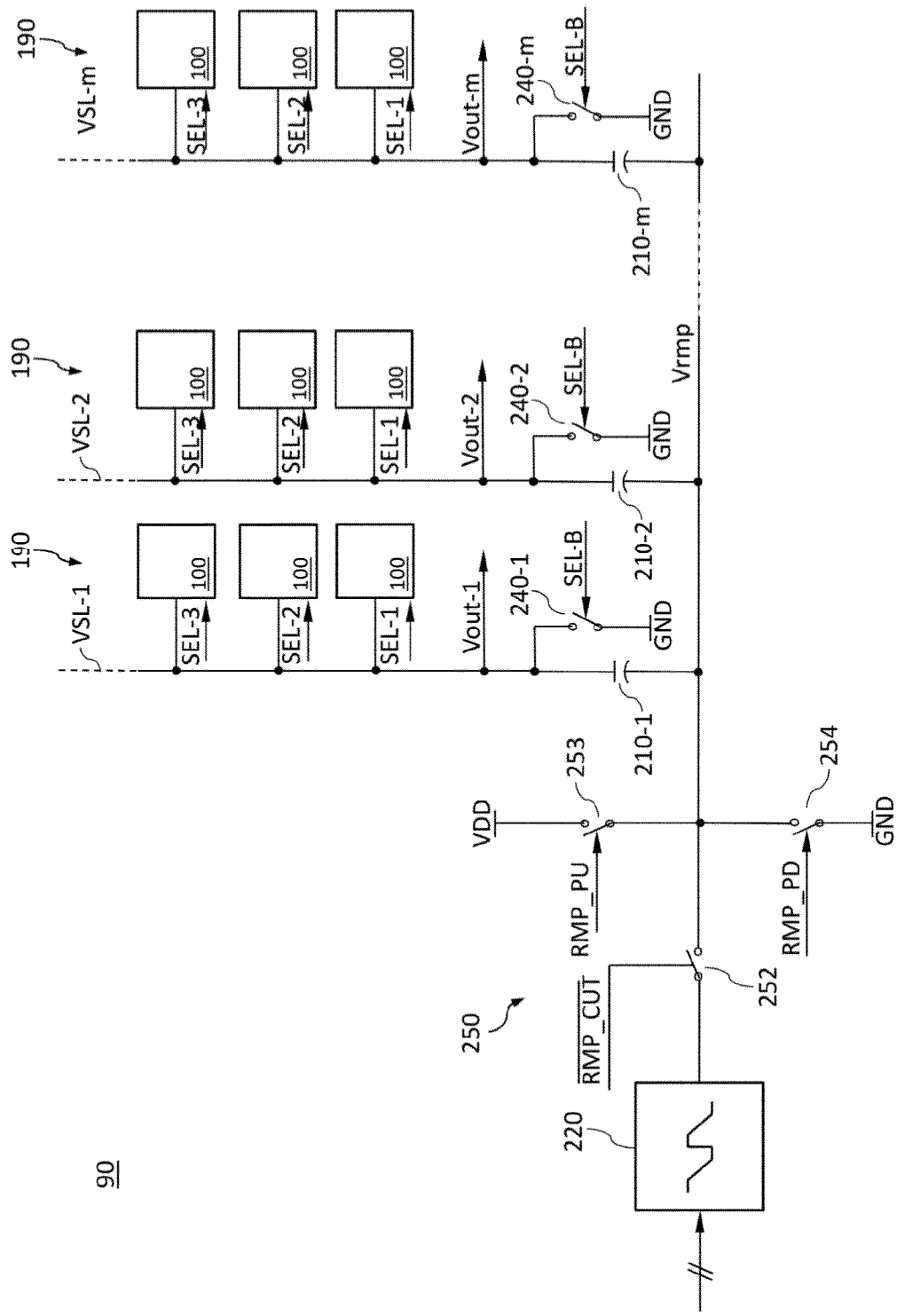
FIG. 12 is a simplified block diagram illustrating a configuration example of a part of an image sensor array including a ramp generator passing a voltage ramp signal to a plurality of current control capacitors according to a further embodiment.

FIG. 12 shows a portion of a solid-state imaging device 90. The solid-state imaging device 90 includes a plurality of pixel circuits 100, wherein each pixel circuit 100 is configured to generate a pixel output signal with an amplitude related to an intensity of detected light, and wherein each pixel circuit 100 is assigned to one of a plurality of pixel columns 190.

The solid-state imaging device 90 further includes a plurality of data signal lines VSL-1, ..., VSL-m, wherein each data signal line VSL-1, ..., VSL-m is configured to receive the pixel output signals of a plurality of pixel circuits 100 assigned to a same pixel column 190, and wherein to each data signal line VSL-1, ..., VSL-m a selected pixel circuit 100 passes the pixel output signal Vout for a selection period;

The solid-state imaging device 90 further includes a plurality of current control capacitor s 210-1, ..., 210-*m*, wherein each current control capacitor 210-1, ..., 210-*m* is configured to supply a current to one of the data signal lines VSL-1, ..., VSL-m through a first electrode in the selection periods.

A ramp generator 220 generates a voltage ramp signal and passes the voltage ramp signal to second electrodes of the current control capacitors 210-1, ..., 210-*m* in the selection periods.

A row selection signal SEL_1, SEL_2, ..., simultaneously selects the pixel circuits 100 of the same pixel row, wherein in each pixel column 190 the pixel circuit 100 assigned to the selected pixel row is selected.

Pre-charge circuits 240-1, . . . , 240-m pre-charge the data signal lines VSL-1, VSL-m in pre-charge periods outside the selection periods defined by the active row selection signals SEL_1, SEL_2, . . . . For example, a pre-charge signal SEL_B controlling the pre-charge circuits 240-1, . . . , 240-m may be or may approximate the inverted of the ORed row selection signals SEL_1, SEL_2, . . . .

A capacitor control circuit 250 may decouple the second electrodes of the current control capacitors 210-1, . . . , 210-m from an output of the ramp generator 220 in initial phases at start of the selection periods and/or in tail phases at end of the row selection periods as described with reference to FIGS. 7 and 8.

Figure 13:
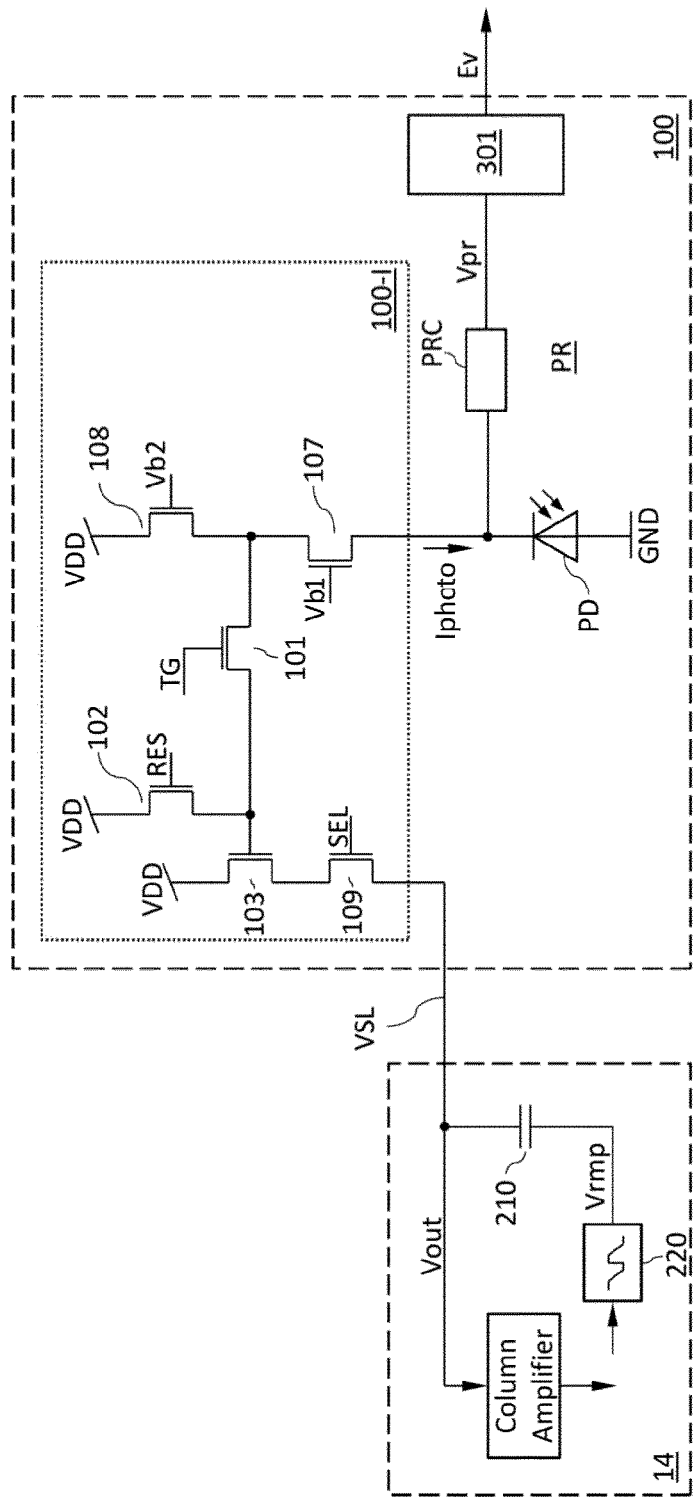
FIG. 13 is a simplified circuit diagram of a pixel circuit providing simultaneously intensity readout and event detection.

FIG. 13 refers to a pixel circuit 100 including an intensity readout circuit 100-I and a photoreceptor module PR for event detection, wherein the intensity readout circuit 100-I and the photoreceptor module PR share a common photoelectric conversion element PD. The photoreceptor module PR includes a photoreceptor circuit PRC that converts the photocurrent Iphoto into a photoreceptor signal Vpr, wherein a voltage of the photoreceptor signal Vpr is a function of the photocurrent Iphoto, and wherein in the range of interest the voltage of the photoreceptor signal Vpr increases with increasing photocurrent Iphoto. The photoreceptor circuit PRC may include a logarithmic amplifier. An event detector circuit 301 receives the photoreceptor signal Vpr and generates an event detection signal Ev when a change of the voltage level of the photoreceptor signal Vpr exceeds a predetermined threshold.

The intensity readout circuit 100-I includes an n-channel anti-blooming transistor 108 and an n-channel decoupling transistor 107 which are electrically connected in series between the high supply voltage VDD and the photoelectric conversion element PD. The anti-blooming transistor 108 and the decoupling transistor 107 may be controlled by fixed bias voltages Vb2, Vb1 applied to the gates. Additional elements, e.g. a controlled path of a feedback portion of the photoreceptor circuit PRC may be electrically connected in series between the decoupling transistor 107 and the photoelectric conversion element PD.

Decoupling transistor 107 may basically decouple the photoreceptor circuit PRC from voltage transients at the center node between the decoupling transistor 107 and the anti-blooming transistor 108. The anti-blooming transistor 108 may ensure that the voltage at the center node between the decoupling transistor 107 and the anti-blooming transistor 108 does not fall below a certain level given by the difference between the bias voltage Vb2 at the gate of the anti-blooming transistor 108 and the threshold voltage of the anti-blooming transistor 108 in order to ensure proper operation of the photoreceptor circuit PRC.

The source of the n-channel transfer transistor 101 is electrically connected to the center node between the decoupling transistor 107 and the anti-blooming transistor 108. For the further components of the intensity readout circuit 100-I, reference is made to the description of the pixel circuit 100 in FIG. 1.

Alternative embodiments of the intensity readout circuit 100-I may be realized without transfer transistor 101, wherein the reset transistor 102 may replace the anti-blooming transistor 108, and wherein the source of the reset transistor 102 is directly connected to the gate of the amplifier transistor 103.

In the photoreceptor circuit block of FIG. 13, the intensity detection circuit 100-I and the photoreceptor circuit PRC for event detection are electrically connected in series with respect to the photocurrent Iphoto, wherein evaluation of intensity and detection of events may be performed substantially contemporaneously.

Figure 14:
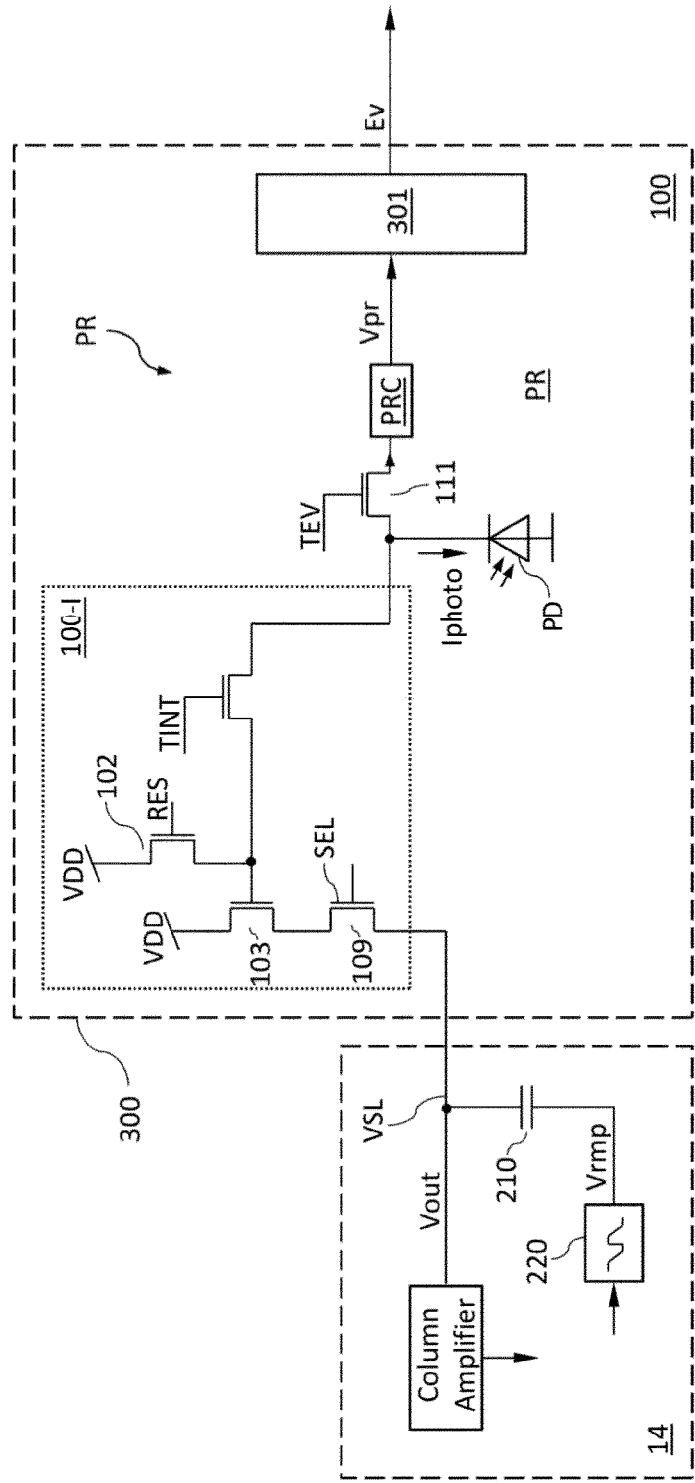
FIG. 14 is a simplified circuit diagram of a pixel circuit switchable between intensity readout and event detection.

The pixel circuit 100 in FIG. 14 includes a first mode selector 111 and a second mode selector 112. The first mode selector 111 is connected between the cathode of the photoelectric conversion element PD and a photoreceptor circuit PRC. The second mode selector 112 is connected between the cathode of the photoelectric conversion element PD and the amplifier transistor 103 of an intensity readout circuit 100-I. A first mode selector signal TEV controls the first mode selector 111. A second mode selector signal TINT controls the second mode selector 112.

The first and second mode selectors 111, 112 electrically connect the photoelectric conversion element PD with the photoreceptor circuit PRC in a first operating state and with the intensity readout circuit 100-I in a second operating state. In addition, the first and second mode selectors 111, 112 may disconnect the photoelectric conversion element PD from the intensity readout circuit 100-I in the first operating state and may disconnect the photoelectric conversion element PD from the photoreceptor circuit PRC in the second operating state. The first and second mode selectors 111, 112 may be electronic switches, for example FETs or transfer gates.

Figure 15:
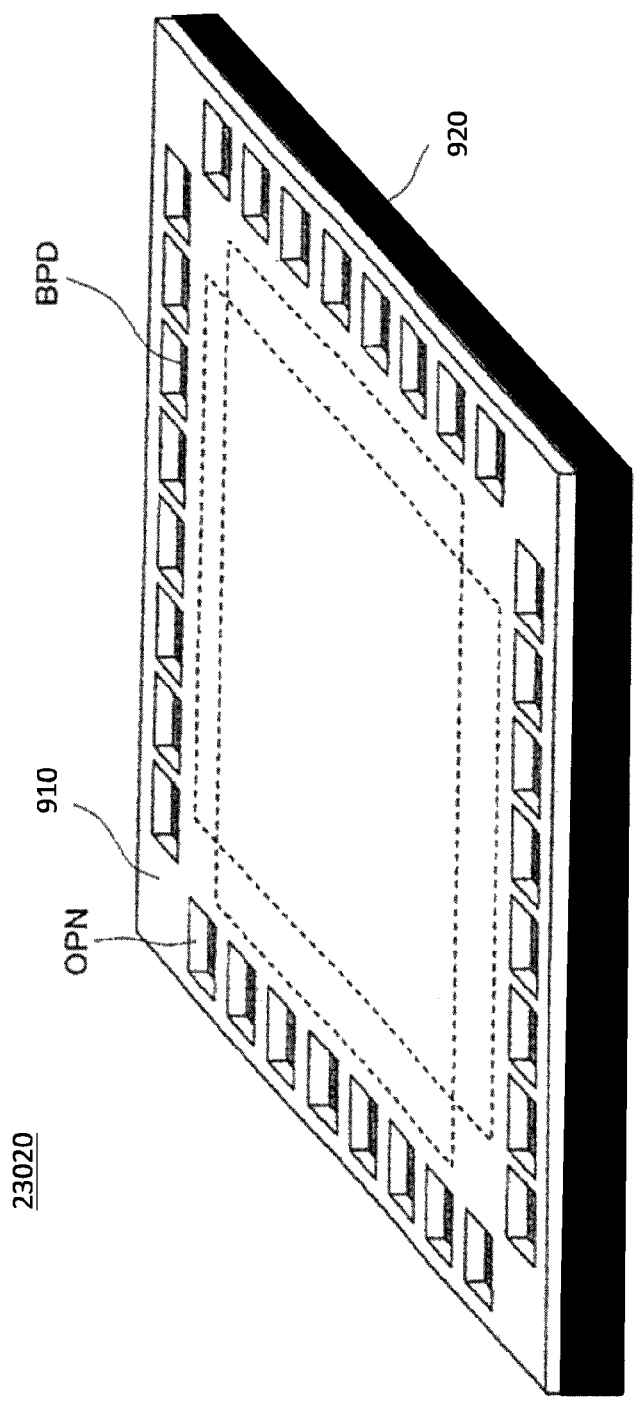
FIG. 15 illustrates an overview of a configuration example of a multi-layer solid-state imaging device to which a technology according to the present disclosure may be applied.

FIG. 15 is a perspective view showing an example of a laminated structure of a solid-state imaging device 23020 with a plurality of pixels arranged matrix-like in array form. Each pixel includes at least one photoelectric conversion element.

The solid-state imaging device 23020 has the laminated structure of a first chip (upper chip) 910 and a second chip (lower chip) 920.

The laminated first and second chips 910, 920 may be electrically connected to each other through TC(S)Vs (Through Contact (Silicon) Vias) formed in the first chip 910.

The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel circuit, e.g., the photoelectric conversion elements arranged in array form.

For example, the first chip 910 may include only the photoelectric conversion elements of the pixel circuits as described above with reference to the preceding FIGS. Alternatively, the first chip 910 may include further elements of each pixel circuit. For example, the first chip 910 may include, in addition to the photoelectric conversion elements, at least the transfer transistor, the reset transistor, the amplification transistor, and/or the selection transistor of the pixel circuits. Alternatively, the first chip 910 may include each element of the pixel circuit. Alternatively, the first chip 910 may include each element of the pixel circuit and the capacitor control circuit 230 of FIG. 4.

The second chip 920 may be mainly a logic chip (digital chip) that includes the elements complementing the elements on the first chip 910 to complete pixel circuits and current control circuits. The second chip 920 may also include analog circuits, for example circuits that quantize analog signals transferred from the first chip 910 through the TCVs.

The second chip 920 may have one or more bonding pads BPD and the first chip 910 may have openings OPN for use in wire-bonding to the second chip 920.

The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

Figure 16:
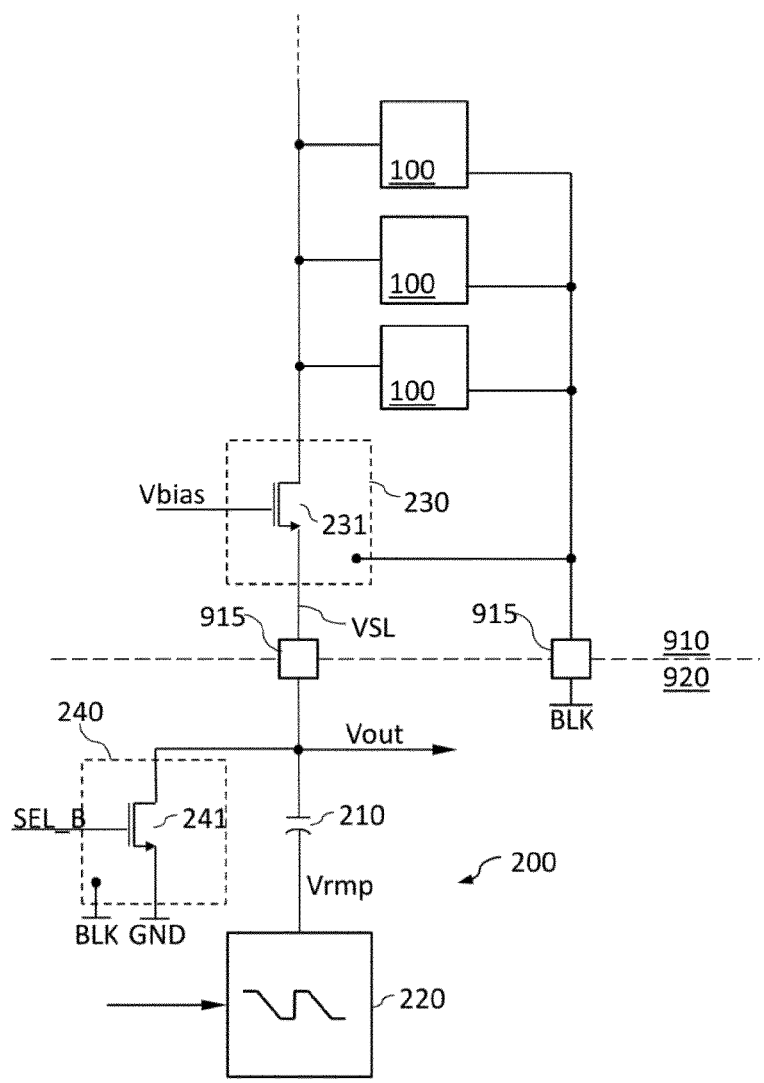
FIG. 16 is a schematic circuit diagram of elements of an image sensor array formed on a second chip of a solid-state imaging device with laminated structure according to an embodiment.

FIG. 16 shows a possible allocation of elements of a solid-stage imaging device across the first chip 910 and the second chip 920 of FIG. 15.

The first chip 910 may include the pixel circuits 100 with photoelectric conversion elements. The second chip 920 may include inter alia the column signal processing unit 14 with the constant current circuit 200. One through contact via 915 per pixel circuit 100 may be part of the data signal line VSL and passes the pixel output signal Vout from the first chip 910 to the second chip 920.

In addition, a capacitance control circuit 230 connected between the data signal line VSL and the current control capacitor 210 to reduce a capacitive load effective for the pixel output signal Vout may be formed on the first chip 910.

The pre-charge circuit 240 may include an n channel FET as first switching element 241 that passes the voltage reference potential GND or another low voltage to the data signal line VSL in the pre-charge periods.

The substrate bulk of the transistors of the pixel circuits 100 and the capacitance control circuit 230 may be connected. A further through contact via 915 may pass a bulk potential BLK from the second chip 920 to the first chip 910. The n channel FET of the pre-charge circuit 240 may be realized on the second chip 920 as illustrated, or on the first chip 910. In both cases, the substrate bulk of the n channel FET of the pre-charge circuit 240 may be connected to the bulk potential BLK, The source of the n channel FET of the pre-charge circuit 240 may be connected to the voltage reference potential GND as illustrated or to the bulk potential BLK.

The bulk potential BLK may be more negative than the voltage reference potential GND to further expand the voltage swing of the pixel output signal Vout.

Figure 17:
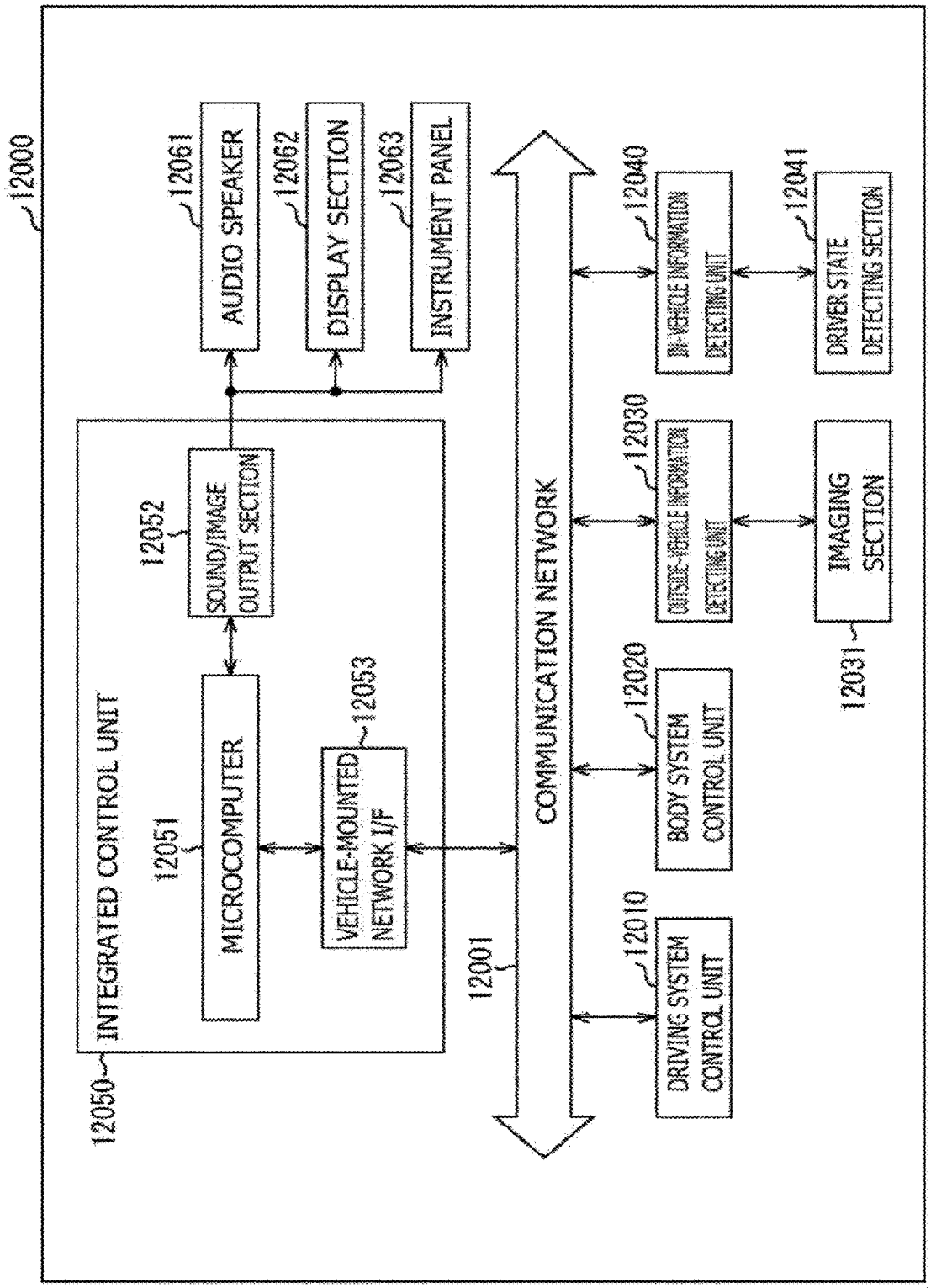
FIG. 17 is a block diagram depicting an example of a schematic configuration of a vehicle control system.

FIG. 17 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 17, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include an image sensor assembly or a solid-state imaging device with a constant current circuit including a current control capacitor and a ramp generator according to the embodiments of the present disclosure. The light received by the imaging section 12031 may be visible light, or may be invisible light such as infrared rays or the like.

The in-vehicle information detecting unit 12040 detects information about the inside of the vehicle and may be or may include an image sensor assembly or a solid-state imaging device with a constant current circuit including a current control capacitor and a ramp generator according to the embodiments of the present disclosure. The in-vehicle information detecting unit 12040 is, for example, connected with a driver state detecting section 12041 that detects the state of a driver. The driver state detecting section 12041, for example, includes a camera that includes the solid-stage imaging device and that is focused on the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 17, an audio speaker 12061, a display section 12062, and an instrument panel 12063 are illustrated as the output device. The display section 12062 may, for example, include at least one of an on-board display or a head-up display.

Figure 18:
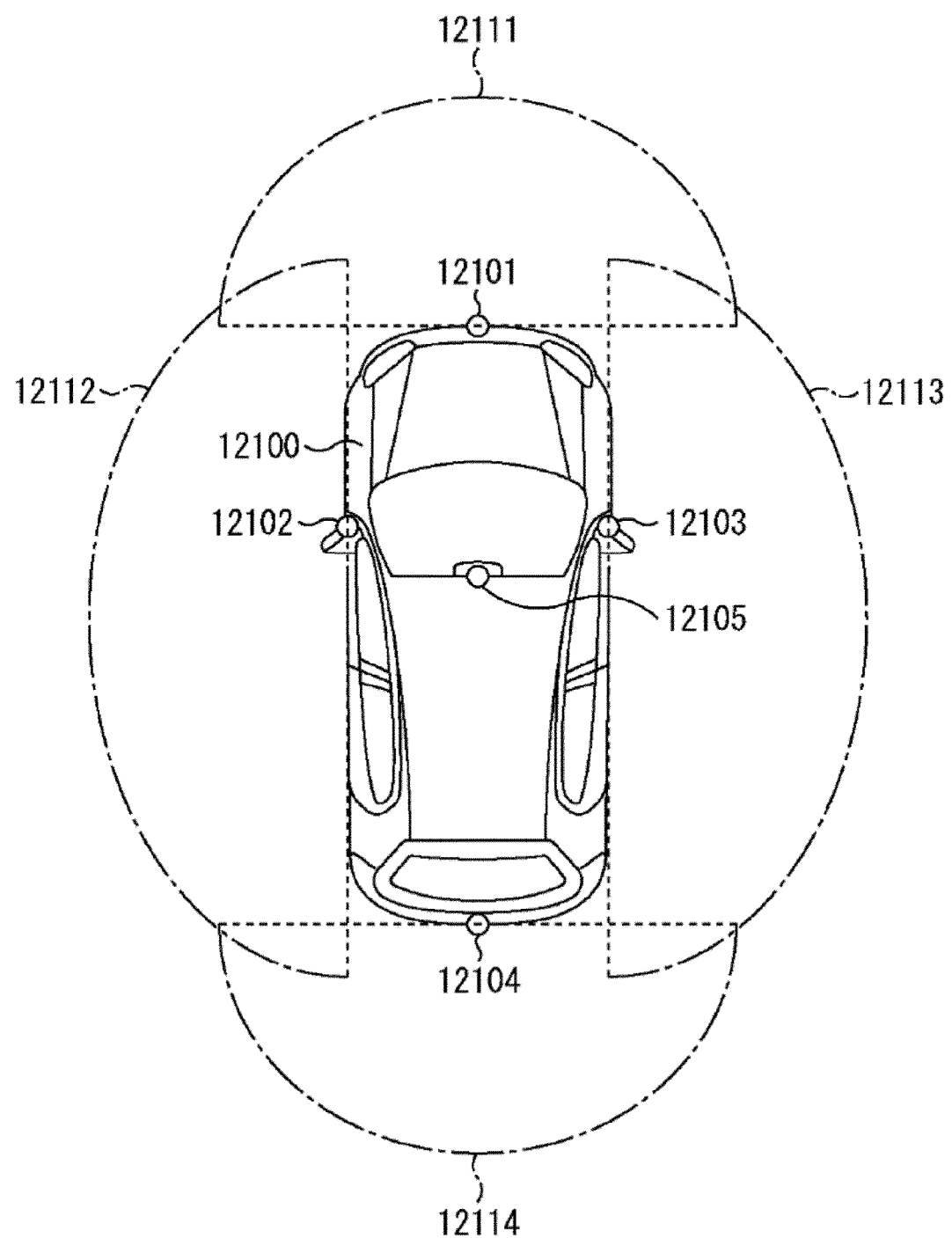
FIG. 18 is a diagram of assistance in explaining an example of installation positions of an outside-vehicle information detecting section and an imaging section of the vehicle control system of FIG. 17.

FIG. 18 is a diagram depicting an example of the installation position of the imaging section 12031, wherein the imaging section 12031 may include imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 18 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, imaging element having pixels for phase difference detection or may include a ToF module including an image sensor assembly or a solid-state imaging device with a constant current circuit including a current control capacitor and a ramp generator according to the embodiments of the present disclosure.

For example, the microcomputer 12051 can determine a distance to each three-dimensional object within the imaging ranges 12111 to 12114 and a temporal change in the distance (relative speed with respect to the vehicle 12100 on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. By applying the an image sensor assembly or a solid-state imaging device with a constant current circuit including a current control capacitor and a ramp generator according to the embodiments of the present disclosure, the sensors can be provided with higher dynamic range and better signal-to-noise ratio.

Additionally, embodiments of the present technology are not limited to the above-described embodiments, but various changes can be made within the scope of the present technology without departing from the gist of the present technology.

The solid-state imaging device according to the present disclosure may be any device used for analyzing and/or processing radiation such as visible light, infrared light, ultraviolet light, and X-rays. For example, the solid-state imaging device may be any electronic device in the field of traffic, the field of home appliances, the field of medical and healthcare, the field of security, the field of beauty, the field of sports, the field of agriculture, the field of image reproduction or the like.

Specifically, in the field of image reproduction, the solid-state imaging device may be a device for capturing an image to be provided for appreciation, such as a digital camera, a smart phone, or a mobile phone device having a camera function. In the field of traffic, for example, the solid-state imaging device may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the solid-state imaging device may be integrated in any type of sensor that can be used in devices provided for home appliances such as TV receivers, refrigerators, and air conditioners to capture gestures of users and perform device operations according to the gestures. Accordingly the solid-state imaging device may be integrated in home appliances such as TV receivers, refrigerators, and air conditioners and/or in devices controlling the home appliances. Furthermore, in the field of medical and healthcare, the solid-state imaging device may be integrated in any type of sensor, e.g. a solid-state image device, provided for use in medical and healthcare, such as an endoscope or a device that performs angiography by receiving infrared light.

In the field of security, the solid-state imaging device can be integrated in a device provided for use in security, such as a monitoring camera for crime prevention or a camera for person authentication use. Furthermore, in the field of beauty, the solid-state imaging device can be used in a device provided for use in beauty, such as a skin measuring instrument that captures skin or a microscope that captures a probe. In the field of sports, the solid-state imaging device can be integrated in a device provided for use in sports, such as an action camera or a wearable camera for sport use or the like. Furthermore, in the field of agriculture, the solid-state imaging device can be used in a device provided for use in agriculture, such as a camera for monitoring the condition of fields and crops.

The present technology can also be configured as described below:

(1) An image sensor array, including:
- a pixel circuit configured to generate a pixel output signal with an amplitude related to an intensity of detected light and to pass the pixel output signal to a data signal line for a selection period;
- a current control capacitor configured to supply a current to the data signal line through a first electrode in the selection period; and
- a ramp generator configured to generate a voltage ramp signal and to pass the voltage ramp signal to a second electrode of the current control capacitor in the selection period.

(2) The image sensor array according to (1), further including:
- a capacitance control circuit connected between the data signal line and the current control capacitor, wherein the capacitance control circuit is configured to reduce a capacitive load effective for the pixel output signal.

(3) The image sensor array according to (2),
wherein the capacitance control circuit includes an FET.

(4) The image sensor array according to any of (1) to (3), further including:
- a pre-charge circuit configured to pre-charge the data signal line in a pre-charge period outside the selection period.

(5) The image sensor array according to (4),
wherein the pre-charge circuit includes a first switching element configured to pass a voltage reference potential to the data signal line in the pre-charge period.

(6) The image sensor array according to any of (4) to (5),
wherein the pre-charge circuit is configured to start each pre-charge period with end of a preceding selection period and to end each pre-charge period with start of a following selection period.

(7) The image sensor array according to any of (1) to (6), further including:
- a capacitor control circuit configured to decouple the second electrode of the current control capacitor from an output of the ramp generator in an initial phase at a start of the selection period and/or in a tail phase at an end of the selection period.

(8) The image sensor array according to (7),
wherein the capacitor control circuit includes a second switching element configured to disconnect the second electrode of the current control capacitor from the output of the ramp generator in the initial phase and/or in the tail phase.

(9) The image sensor array according to any of (7) to (8),
wherein the capacitor control circuit includes a third switching element configured to pass a first constant voltage to the second electrode of the current control capacitor in the initial phase.

(10) The image sensor array according to any of (7) to (9),
wherein the capacitor control circuit includes a fourth switching element configured to pass a second constant voltage to the second electrode of the current control capacitor in the trail phase.

(11) The image sensor array according to any of (1) to (10),
wherein the ramp generator includes a plurality of switchable current supply cells connected in parallel and an output resistor, wherein each current supply cell includes a cell current source and a primary switching element connected in series, and wherein the output resistor is connected between the parallel connected current supply cells and a constant voltage.

(12) The image sensor array according to (11), wherein each switchable current cell further includes a secondary switching element connected in series between the cell current source and the constant voltage.

(13) The image sensor array according to any of (11) to (12), further including:
a counter configured to control the switchable current supply cells.

(14) A solid-state imaging device, including:
a plurality of pixel circuits, wherein each pixel circuit is configured to generate a pixel output signal with an amplitude related to an intensity of detected light, and wherein each pixel circuit is assigned to one of a plurality of pixel columns,
a plurality of data signal lines, wherein each data signal line is configured to receive the pixel output signals of a plurality of pixel circuits assigned to a same pixel column, and wherein to each data signal line one selected pixel circuit passes the pixel output signal for a selection period;
a plurality of current control capacitors, wherein each current control capacitor is configured to supply a current to one of the data signal lines through a first electrode in the selection periods; and
a ramp generator configured to generate a voltage ramp signal and to pass the voltage ramp signal to second electrodes of the current control capacitors in the selection period.

(15) The solid-state imaging device according to (14), further including:
a capacitor control circuit configured to decouple the second electrodes of the current control capacitors from an output of the ramp generator in initial phases at start of the selection periods and/or in tail phases at end of the selection periods.

The invention claimed is:

1. An image sensor array, comprising:
a pixel circuit configured to generate a pixel output signal with an amplitude related to an intensity of detected light and to pass the pixel output signal to a data signal line for a selection period;
a current control capacitor configured to supply a current to the data signal line through a first electrode in the selection period; and
a ramp generator configured to generate a voltage ramp signal and to pass the voltage ramp signal to a second electrode of the current control capacitor in the selection period.

2. The image sensor array according to claim 1, further comprising:
a capacitance control circuit connected between the data signal line and the current control capacitor, wherein the capacitance control circuit is configured to reduce a capacitive load effective for the pixel output signal.

3. The image sensor array according to claim 2, wherein the capacitance control circuit comprises an FET.

4. The image sensor array according to claim 1, further comprising:
a pre-charge circuit configured to pre-charge the data signal line in a pre-charge period outside the selection period.

5. The image sensor array according to claim 4, wherein the pre-charge circuit comprises a first switching element configured to pass a voltage reference potential to the data signal line in the pre-charge period.

6. The image sensor array according to claim 4, wherein the pre-charge circuit is configured to start each pre-charge period with end of a preceding selection period and to end each pre-charge period with start of a following selection period.

7. The image sensor array according to claim 1, further comprising:
a capacitor control circuit configured to decouple the second electrode of the current control capacitor from an output of the ramp generator in an initial phase at a start of the selection period and/or in a tail phase at an end of the selection period.

8. The image sensor array according to claim 7, wherein the capacitor control circuit comprises a second switching element configured to disconnect the second electrode of the current control capacitor from the output of the ramp generator in the initial phase and/or in the tail phase.

9. The image sensor array according to claim 7, wherein the capacitor control circuit comprises a third switching element configured to pass a first constant voltage to the second electrode of the current control capacitor in the initial phase.

10. The image sensor array according to claim 7, wherein the capacitor control circuit comprises a fourth switching element configured to pass a second constant voltage to the second electrode of the current control capacitor in the trail phase.

11. The image sensor array according to claim 1, wherein the ramp generator comprises a plurality of switchable current supply cells connected in parallel and an output resistor, wherein each current supply cell comprises a cell current source and a primary switching element connected in series, and wherein the output resistor is connected between the parallel connected current supply cells and a constant voltage.

12. The image sensor array according to claim 11, wherein each switchable current cell further comprises a secondary switching element connected in series between the cell current source and the constant voltage.

13. The image sensor array according to claim 11, further comprising:
a counter configured to control the switchable current supply cells.

14. A solid-state imaging device, comprising:
a plurality of pixel circuits, wherein each pixel circuit is configured to generate a pixel output signal with an amplitude related to an intensity of detected light, and wherein each pixel circuit is assigned to one of a plurality of pixel columns,
a plurality of data signal lines, wherein each data signal line is configured to receive the pixel output signals of a plurality of pixel circuits assigned to a same pixel column, and wherein to each data signal line one selected pixel circuit passes the pixel output signal for a selection period;
a plurality of current control capacitors, wherein each current control capacitor is configured to supply a current to one of the data signal lines through a first electrode in the selection periods; and a ramp generator configured to generate a voltage ramp signal and to pass the voltage ramp signal to second electrodes of the current control capacitors in the selection period.

15. The solid-state imaging device according to claim 14, further comprising:
a capacitor control circuit configured to decouple the second electrodes of the current control capacitors from an output of the ramp generator in initial phases at start of the selection periods and/or in tail phases at end of the selection periods.

* * * * *